(12) United States Patent
Muehlbauer et al.

(10) Patent No.: US 7,194,352 B2
(45) Date of Patent: Mar. 20, 2007

(54) METHOD AND ARRANGEMENT FOR CONTROLLING THE SPEED OF A VEHICLE

(75) Inventors: Christian Muehlbauer, Echterdingen (DE); Erwin Lock, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 257 days.

(21) Appl. No.: 10/676,096

(22) Filed: Oct. 2, 2003

(65) Prior Publication Data

US 2004/0088098 A1   May 6, 2004

(30) Foreign Application Priority Data

Oct. 2, 2002   (DE)   ............................... 102 46 059

(51) Int. Cl.
  *B60T 8/32*   (2006.01)
(52) U.S. Cl. ..................................... 701/93; 180/179
(58) Field of Classification Search ................. 701/53, 701/54, 62, 208, 209, 211, 93, 96; 180/170–179; 340/441, 996; 342/357.01, 357.06, 357.12, 342/457
  See application file for complete search history.

(56) References Cited

U.S. PATENT DOCUMENTS

| | | | | |
|---|---|---|---|---|
| 4,845,622 A | | 7/1989 | Suzuki et al. | |
| 5,270,708 A | * | 12/1993 | Kamishima | 340/995.24 |
| 5,311,173 A | * | 5/1994 | Komura et al. | 340/995.22 |
| 5,343,780 A | * | 9/1994 | McDaniel et al. | 477/108 |
| 5,485,161 A | * | 1/1996 | Vaughn | 342/357.13 |
| 5,835,877 A | * | 11/1998 | Unuvar et al. | 701/93 |
| 5,864,771 A | * | 1/1999 | Yokoyama et al. | 701/208 |
| 6,675,081 B2 | * | 1/2004 | Shuman et al. | 701/48 |

FOREIGN PATENT DOCUMENTS

DE   100 35 035   1/2002

\* cited by examiner

*Primary Examiner*—Richard M. Camby
(74) *Attorney, Agent, or Firm*—Walter Ottesen

(57) ABSTRACT

A method and an arrangement for controlling the speed of a vehicle make possible a comfortable adaptation of an incrementation or decrementation of a pregiven desired speed. The desired speed is changed by the actuation of an operator-controlled element (1). The extent of the change of the desired speed is adjusted in dependence upon at least one piece of data as to the instantaneous driving situation of the vehicle.

14 Claims, 3 Drawing Sheets

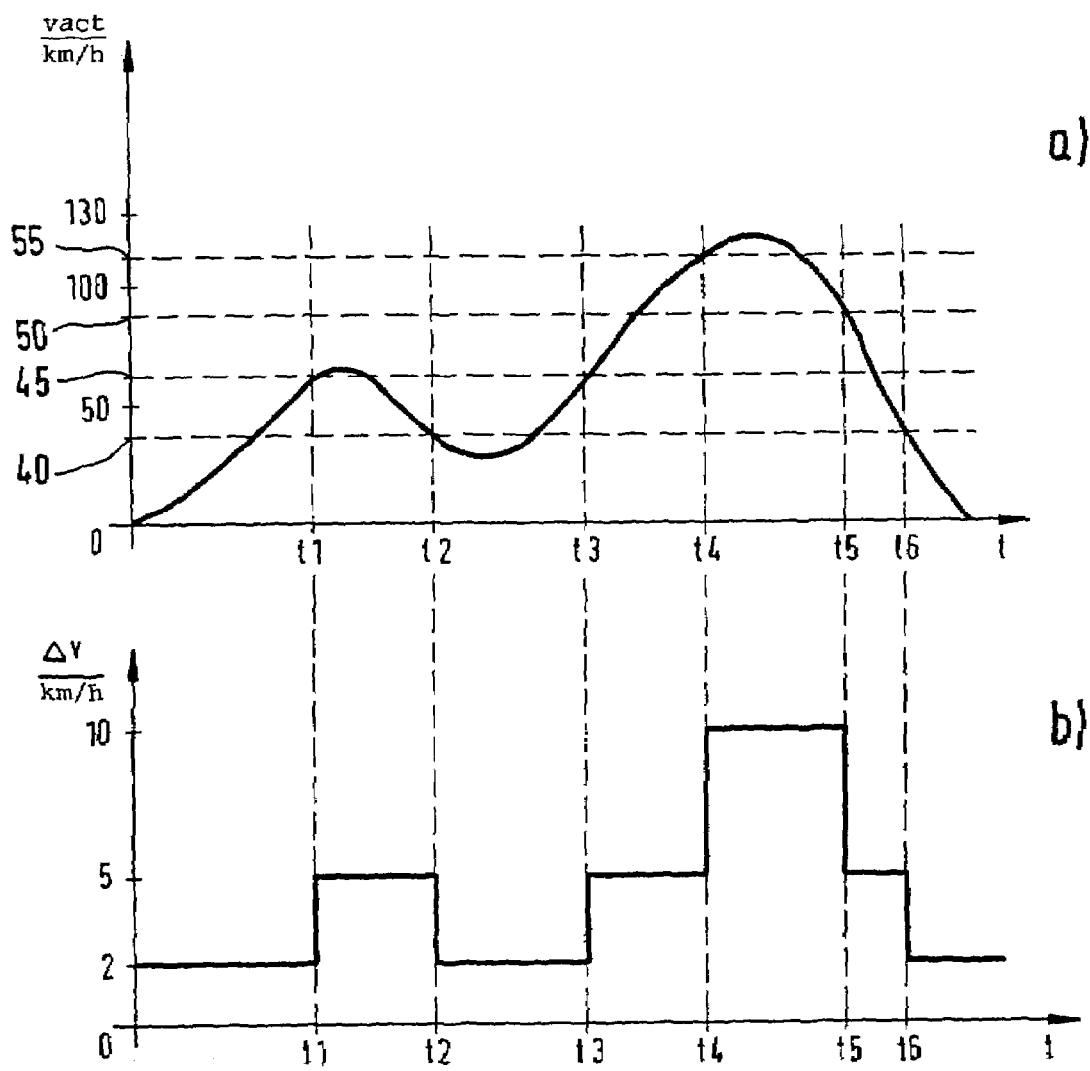

METHOD AND ARRANGEMENT FOR CONTROLLING THE SPEED OF A VEHICLE

CROSS REFERENCE TO RELATED APPLICATION

This application claims priority of German patent application No. 102 46 059.0, filed Oct. 2, 2002, the entire content of which is incorporated herein by reference.

BACKGROUND OF THE INVENTION

Cruise control systems are already known wherein a pregiven desired speed can be incremented or decremented by a fixed pregiven value by actuating an operator-controlled element. If the vehicle is in a state in which the pregiven desired speed is to be maintained for an active cruise control system, the driver can, with a one-time actuation of the operator-controlled element in a first direction, increment the pregiven desired speed by a fixed pregiven value, for example, 2 km/h. The operator-controlled element is configured, for example, as a steering column lever. With a one-time actuation of the steering column lever in a second direction, the pregiven desired speed can be correspondingly decremented by the fixed pregiven value. At low vehicle speeds, this fixedly pregiven value for incrementing or decrementing the pregiven desired speed is fully adequate. At high speeds, such as greater than 100 km/h, the driver must actuate the steering column lever repeatedly for a clear increase of the desired speed. If, for example, when driving on an expressway, an increase of the pregiven desired speed by 20 km/h is wanted by the driver, then the driver must move the steering column lever 10 times in the first direction in order to realize this increase when a fixed increment value of 2 km/h is pregiven.

SUMMARY OF THE INVENTION

The method of the invention and the arrangement of the invention afford the advantage compared to the above that the extent of the change of the desired value is adjusted in dependence upon at least one piece of data as to a current or instantaneous driving situation of the vehicle. In this way, the step width for an incrementation or decrementation of the pregiven desired speed can be varied and adapted to external conditions such as the instantaneous driving speed and/or at least an environmental condition. This makes possible an increased comfort for the driver of the vehicle when actuating the operator-controlled element and distracts the driver less from driving. Furthermore, a more intuitive operator actuation of the speed controller by the driver is made possible.

It is especially advantageous when the instantaneous driving situation is defined by the instantaneous location of the vehicle. Different locations, for example, different countries have different pregiven maximum speeds and make purposeful a corresponding adaptation of the step width for the incrementation or decrementation of the pregiven desired value for the vehicle speed and thereby relieve the driver of the vehicle.

A further advantage results when the instantaneous driving situation is defined by the roadway just then driven upon. In this way, the step width for the incrementation or decrementation of the pregiven desired value for the vehicle speed can be adjusted in dependence upon the maximum speed permissible upon the roadway just then driven on whereby the driver is relieved.

It is especially advantageous when the instantaneous driving situation is defined by an instantaneous actual speed of the vehicle. In this way, the step width for the incrementation or decrementation of the pregiven desired value for the vehicle speed can be oriented on the instantaneous actual speed of the vehicle and can therewith especially reliably be adapted to the instantaneous driving situation of the vehicle.

A further advantage is that different extents of the change of the desired value are assigned to different speed ranges. This defines an especially simple adaptation of the step width for the incrementation or decrementation to the instantaneous driving situation; that is, the step width is generally the change of the desired value for the driving speed.

It is also especially advantageous when the extent of the change of the desired value for different driving situations is pregiven at an operator-controlled unit. In this way, an individual adaptation of the extent of the change of the desired value for the vehicle speed to the instantaneous driving situation is made possible in dependence upon the command of the driver so that the comfort for the driver is further increased.

A further advantage is that the extent of the change of the desired value is changed by means of a hysteresis in dependence upon the instantaneous driving situation. In this way, a continuous change of the step width for the incrementation or decrementation of the pregiven desired value for the vehicle speed is prevented when the instantaneous driving situation is such that, for example, the instantaneous actual speed of the vehicle fluctuates continuously about a threshold. This condition would lead to a change of the extent of the change ($\Delta v$) of the desired value for the vehicle speed when this threshold is exceeded or when there is a drop below this threshold. A permanent change of the step width for the incrementation or decrementation of the pregiven desired value for the vehicle speed is thereby prevented.

BRIEF DESCRIPTION OF THE DRAWINGS

The invention will now be described with reference to the drawings wherein:

FIG. 3a shows a trace of the actual speed of the vehicle as a function of time; and, FIG. 3b shows a corresponding trace of the step width for the change of a pregiven desired value of the vehicle speed.

DESCRIPTION OF THE PREFERRED EMBODIMENTS OF THE INVENTION

Figure 1:
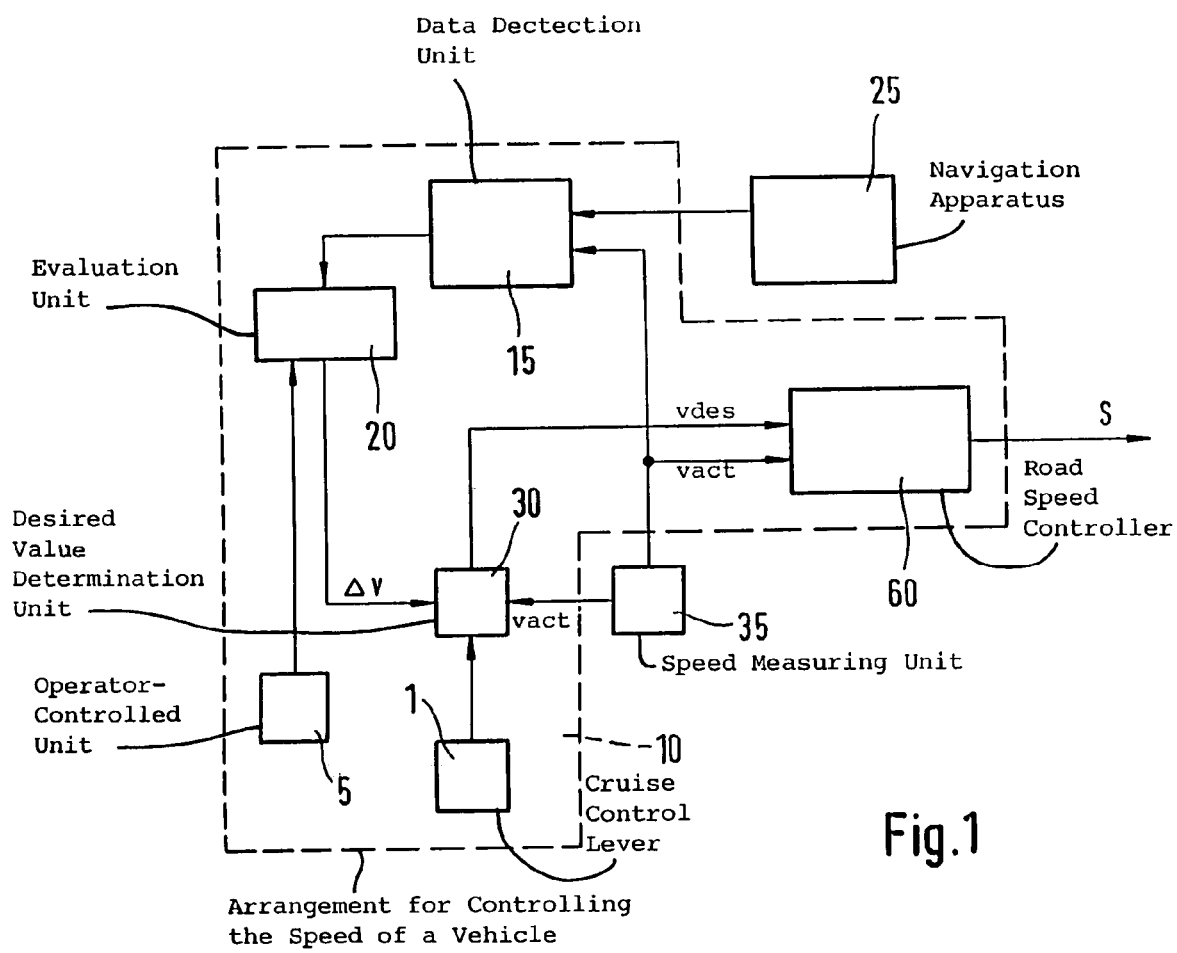
FIG. 1 is a block circuit diagram of an arrangement according to the invention.

In FIG. 1, reference numeral 10 identifies an arrangement of the invention for controlling the speed of a vehicle. This arrangement can be implemented with hardware and/or software in a motor control of a vehicle. The arrangement includes a road speed controller 60 to which, on the one hand, a desired value vdes for the speed of the vehicle is supplied as an input quantity and, on the other hand, an instantaneous actual speed vact of the vehicle is supplied. The desired value vdes is also referred to as desired speed in the following. The road speed controller 60 outputs an actuating quantity S in dependence upon the difference between the desired speed vdes and the actual speed vact in order to minimize the difference between the desired speed vdes and the actual speed vact and to thereby permit the actual speed vact to track the pregiven desired speed vdes as accurately as possible. The actuating quantity S can, for example, be a torque which is to be realized by the drive unit of the vehicle. Alternatively, the actuating quantity S can also be a motor rpm or output power which is to be realized by the drive unit or an actuating quantity derived from at least one of the above-mentioned quantities. The drive unit can, for example, be an internal combustion engine, an electric motor or a drive motor based on an alternate drive concept. In the case of an internal combustion engine, the drive unit can, for example, be a spark-ignition engine or a diesel engine. In the case of a spark-ignition engine, the desired quantity S is, for example, realized by adjusting the air supply and/or an ignition time point. In the case of a diesel engine, the actuating quantity S can, for example, be realized by adjusting the injection time point and/or the injection quantity.

The arrangement 10 furthermore includes a desired value determination unit 30 which determines the desired value vdes to be supplied to the road speed controller 60. For this purpose, the desired value determination unit 30 is connected to an evaluation unit 20 and to an operator-controlled element 1. The operator-controlled element 1 can, for example, be a steering column lever in the form of a cruise control lever. In addition, the desired value determination unit 30 is connected to a speed measuring unit 35 which determines the instantaneous actual speed vact of the vehicle and supplies the same to the road speed controller 60 as an input quantity as well as also to the desired value determination unit 30. Furthermore, the arrangement 10 can optionally include an operator-controlled element 5 which is connected to the evaluation unit 20. The evaluation unit 20 is, in turn, connected to means 15 for detecting at least one piece of information or data as to an instantaneous driving situation of the vehicle. As shown in FIG. 1, the information or data detection unit 15 can receive the actual speed vact from the speed measuring unit 35. In addition, or as an alternative, the data detection unit can be connected to a location determination unit 25 which can be configured, for example, as a navigation apparatus. In this example, it should be assumed that the arrangement 10 includes the road speed controller 60, the desired value determination unit 30, the cruise control lever 1, the operator-controlled unit 5, the evaluation unit 20 and the information detection unit 15.

The input of the desired value vdes takes place, for example, in that the cruise control lever 1 is moved to a position "store" in which the lever 1 assumes the value for the instantaneous actual speed vact from the speed measuring unit 35 as a pregiven desired speed vdes and correspondingly supplies the same to the road speed controller 60. In an alternate embodiment of the operator-controlled element, for example by means of a numerical keypad, it can also be provided that the driver of the vehicle inputs the pregiven desired speed vdes directly by actuating the corresponding numerical keys and the desired value determination unit 30 supplies this pregiven desired speed vdes in a corresponding manner to the road speed controller 60.

When the cruise control lever 1 for incrementing or decrementing the pregiven desired speed vdes is actuated, then this incrementation or decrementation takes place in a step width $\Delta v$ which is pregiven by the evaluation unit 20. The evaluation unit 20 determines the step width $\Delta v$ in dependence upon the at least one piece of data, which is supplied by the data detection unit 15, as to the instantaneous driving situation of the vehicle. Here, it can, for example, be provided that the at least one piece of information as to the instantaneous driving situation of the vehicle contains data as to the instantaneous location of the vehicle which is transmitted from the navigation apparatus 25. In addition, or alternatively, the instantaneous driving situation of the vehicle can also be defined by the instantaneous type of roadway over which the vehicle is just then traveling. The information as to the instantaneously driven roadway type can likewise be received in the data detection unit 15 from the navigation apparatus 25. In addition, or as an alternative, the instantaneous driving situation can be defined by an instantaneous actual speed of the vehicle which is supplied to the data detection unit 15 by the speed measuring unit 35. Additionally, or alternatively, one or several additional pieces of data as to the instantaneous driving situation of the vehicle can be supplied to the data detection unit 15, for example, with the aid of a temperature measuring device (not shown in FIG. 1) as to the instantaneous ambient temperature of the vehicle or by means of an air humidity sensor (not shown in FIG. 1) as to the instantaneous air humidity surrounding the vehicle. In this way, information or data as to the instantaneous environmental or peripheral conditions can be transmitted to the data detection unit 15 which characterize the instantaneous driving situation of the vehicle. From the at least one piece of information as to the instantaneous driving situation of the vehicle, which is received from the data detection unit 15, the evaluation unit 20 forms the step width $\Delta v$ in the manner described by way of example hereinafter. Here, various step widths $\Delta v$ for various possible instantaneous driving situations of the vehicle can be pregiven to the evaluation unit 20 by the operator via the operator-controlled unit 5. The various step widths $\Delta v$ can be stored in the evaluation unit 20 or in a memory assigned to the evaluation unit 20 in correspondence to the various driving situations. The memory is not shown in FIG. 1.

If, with an active cruise control system, the vehicle is in a state wherein the desired value vdes, which is pregiven by the desired value determination unit 30, is to be maintained, then the driver can increment the desired speed vdes in a first direction by a one-time short actuation of the cruise control lever 1. With a one-time short actuation of the cruise control lever 1 in a second direction, which is different from the first direction, the desired value determination unit 30 can decrement the desired speed vdes. The step width $\Delta v$ for the incrementation or decrementation is now, however, dependent upon the instantaneous driving situation which, in this example, as described, is determined by the instantaneous location of the vehicle, the instantaneous roadway, which is just then driven over by the vehicle, the instantaneous actual speed vact and/or other external conditions such as the ambient temperature and/or the air humidity.

If the instantaneous driving situation is characterized, for example, by the roadway, which is just then traveled upon, then the step width $\Delta v$ can be selected, for example, at 2 km/h when the instantaneous driven-over roadway is imparted as a roadway in a town by the navigation apparatus 25. For roadways outside of the town, the step width $\Delta v$ can be fixed, for example, at 5 km/h. For expressways, the step width can be fixed, for example, at 10 km/h. These values can be pregiven by the user or they are permanently stored during manufacture of the vehicle in the arrangement 10 or in the memory assigned to the evaluation unit 20. The step width $\Delta v$ can also be determined by the evaluation unit 20 in a pregiven relationship to the particular permissible maximum speed or recommended speed of the instantaneously driven-over roadway. This relationship can be pregiven as a percentage by the driver at the operator-controlled unit 5 or can be permanently stored in the memory assigned to the evaluation unit 20 during manufacture of the vehicle.

For example, as a step width Δv, a value of 5% of the permissible maximum speed or recommended speed of the roadway (which is just then being driven over by the vehicle) can be pregiven or, for the case that the vehicle does not have a navigation apparatus 25, it can be provided to input the step width Δv in dependence upon the instantaneous actual speed vact, for example, likewise in the form of a fixed pregiven percentage, for example 5%. As described, other conditions, which characterize the instantaneous driving situation of the vehicle, can also be applied for determining the step width Δv via the evaluation unit 20.

Figure 2:
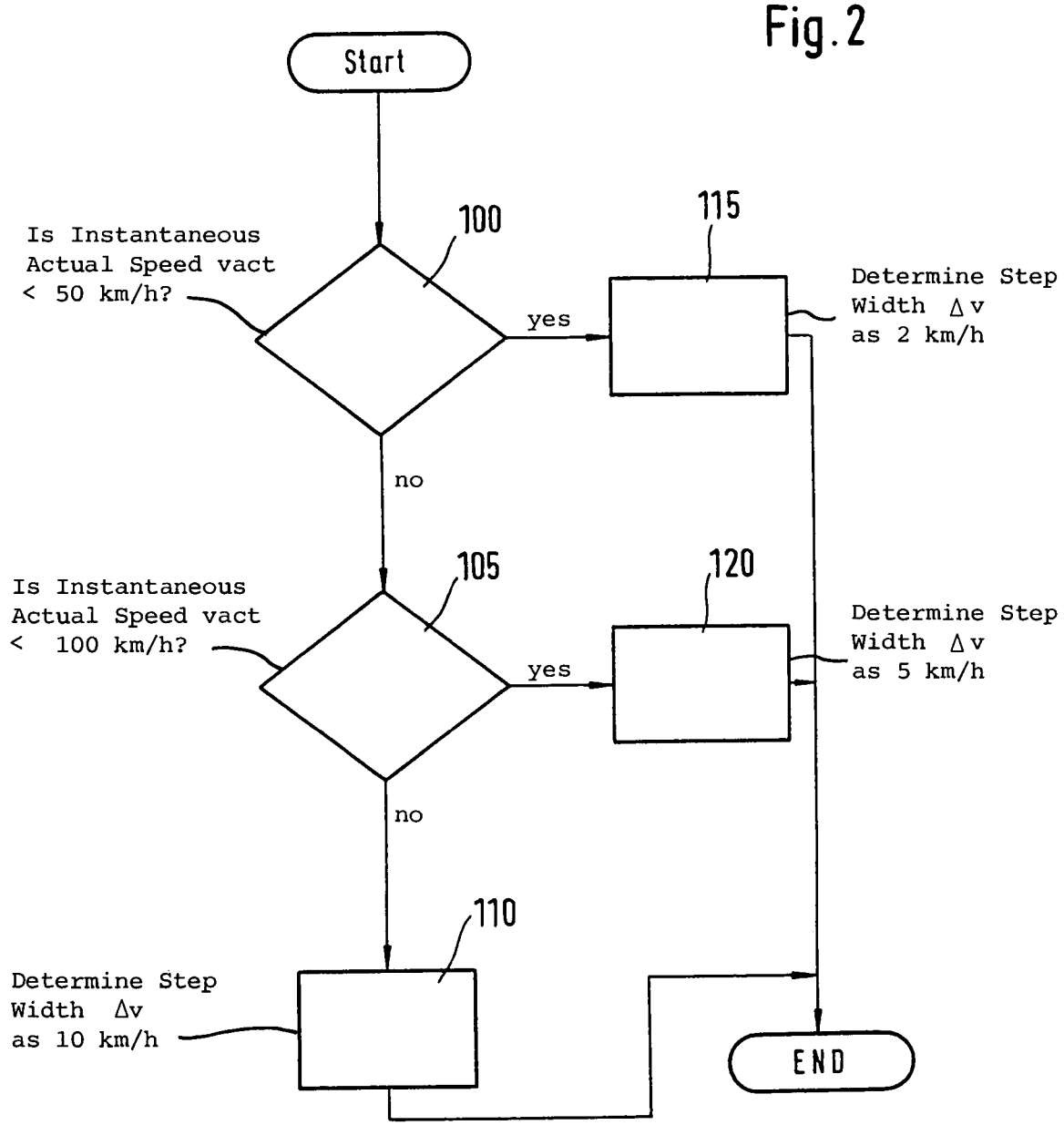
FIG. 2 is a flowchart showing an exemplary sequence of the method of the invention.

In FIG. 2, the method of the invention is explained by way of example with the aid of a flowchart. In a first alternative, the instantaneous driving situation is determined in dependence upon the instantaneous actual speed vact of the vehicle. In a second alternative, the instantaneous driving situation is determined via the roadway which is just then being driven over by the vehicle.

In the following, the sequence is first described for the first alternative. After the start of the program, the evaluation unit 20 checks at program point 100 as to whether the instantaneous actual speed vact is less than 50 km/h. If this is the case, then the program branches to program point 115; otherwise, the program branches to program point 105. At program point 115, the evaluation unit 20 determines a value of 2 km/h as the step width Δv. This value is therefore assigned to all actual speeds of the vehicle which are less than 50 km/h. Thereafter, there is a movement out of the program. At program point 105, the evaluation unit 20 checks whether the instantaneous actual speed of the vehicle is less than 100 km/h. If this is the case, then the program branches to program point 120; otherwise, the program branches to program point 110.

At program point 120, the evaluation unit 20 determines the value 5 km/h as the corresponding step width Δv. In this way, the step width Δv=5 km/h is assigned to the speed range of 50 km/h≦vact≦100 km/h.

Thereafter, there is a movement out of the program.

At program point 110, the evaluation unit 20 determines a value of 10 km/h as the assigned step width Δv. In this way, the step width Δv=10 km/h is assigned to the speed range vact≧100 km/h. Thereafter, there is a movement out of the program.

Accordingly, three different step widths Δv are provided which are each assigned to different speed ranges. Here, it can be provided that the speed ranges as well as also the assigned step widths Δv can be pregiven by the user at the operator-controlled unit 5 or the step widths Δv can be permanently stored in the memory assigned to the evaluation unit 20 during manufacture of the vehicle.

The flowchart of FIG. 2 will now be described for the second alternative of the detection of the instantaneous driving situation via the roadway over which the vehicle instantaneously travels. In this case, after the start of the program, the evaluation unit 20 checks at program point 100 whether the instantaneously driven-over roadway lies within a town and has a permissible maximum speed of 50 km/h. If this the case, then the program branches to program point 115; otherwise the program branches to program point 105.

At program point 115, the evaluation unit 20 determines the value of 2 km/h as the step width Δv. In this way, this value is assigned to all roadways within a town having a permissible maximum speed of 50 km/h. Thereafter, there is a movement out of the program.

At program point 105, the evaluation unit 20 checks whether the instantaneously driven roadway lies outside of town and has a permissible maximum speed of 100 km/h. If this is the case, then the program branches to program point 120; otherwise, the program branches to program point 110. At program point 120, the evaluation unit 20 determines the value of 5 km/h as the assigned step width Δv. In this way, this step width is assigned to all roadways outside of a town having a permissible maximum speed of 100 km/h.

At program point 110, the evaluation unit 20 assumes that the instantaneously driven roadway is an expressway having a permissible maximum speed or recommended speed of 130 km/h. In this case, the evaluation unit 20 determines the value of 10 km/h as the assigned step width Δv. This step width of 10 km/h is assigned to all instantaneously driven roadways which define an expressway. Thereafter, there is a movement out of the program. For this second alternative, it is assumed for the sake of simplicity that there are only three types of roadways, namely, a roadway within towns, roadways outside of towns having a permissible maximum speed of 100 km/h and, finally, expressways. The flowchart of FIG. 2 can, however, be differentiated further for the second alternative in that additional types of roadway having permissible maximum speeds other than those described are provided which lead to a correspondingly assigned step width Δv. It can also be provided to determine the assigned step width Δv as a permanently pregiven percentage of the permissible maximum speed of the instantaneously driven roadway in the evaluation unit 20.

For the case that the instantaneous driving situation is determined based on the instantaneous actual speed vact of the vehicle, it can also be provided as an alternative that the step width Δv is determined as a fixed pregiven percentage of the instantaneous actual speed vact of the vehicle with the actuation of the speed control lever 1 for incrementing or decrementing the instantaneous pregiven desired value vdes. Accordingly, if, for example, when actuating the cruise control lever 1 for incrementing or decrementing the pregiven desired value vdes, the instantaneous actual speed is 90 km/h and the pregiven percentage for the determination of the step width Δv assumes the value 5%, then this would lead to a step width Δv in the amount of 4.5 km/h by which the pregiven desired speed vdes would be incremented or decremented. Here, it can be provided to realize such a percentage for the first alternative as well as for the second alternative to be inputted by the operator at the operator-controlled unit 5 or to be permanently stored during the manufacture of the vehicle in a memory which is assigned to the evaluation unit 20. When using the pregiven percentage for determining the step width Δv, there results in the first alternative the advantage that the step width Δv is adapted to the actual speed vact then present and therefore the actual driving situation is optimally considered. In the second alternative in which the pregiven percentage for the step width Δv is used starting from the maximum speed or recommended speed permissible for the roadway just then traveled over, the instantaneous driving situation is less accurately imaged because the instantaneous actual speed vact of the vehicle can be less than the permissible maximum speed or recommended speed.

In FIG. 3a, a trace of the actual speed vact of the vehicle is plotted in km/h as a function of time (t) by way of example. In this example, the flowchart of FIG. 2 for the first alternative forms the basis for the determination of the step width ≠v and therefore a subdivision of the instantaneous driving situation into three speed ranges, namely: a first speed range of 0≦vact≦50 km/h; a second speed range of 50 km/h≦vact≦100 km/h; and, a third speed range of vact≧100 km/h.

In order to prevent that the step width Δv jumps continuously back and forth when the instantaneous actual speed vact repeatedly crosses the first speed threshold at 50 km/h or the second speed threshold of 100 km/h, additional hysteresis thresholds can be used. Accordingly, in FIG. 3a, a first hysteresis threshold 40 is provided below 50 km/h and a second hysteresis threshold 45 is provided above 50 km/h and a third hysteresis threshold 50 is provided above the second hysteresis threshold 45 and below 100 km/h as well as a fourth hysteresis threshold 55 is provided above 100 km/h. In FIG. 3b, the step width Δv in km/h is plotted as a function of time (t) in correspondence to the time-dependent trace of the actual speed vact of FIG. 3a. From a time point t=0 up to a first time point $t_1$, the actual speed vact of FIG. 3a runs below the second hysteresis threshold 45 which it intersects at the first time point $t_1$. In this way, the threshold width Δv from time point t=0 up to the first time point $t_1$ is 2 km/h in accordance with the described flowchart of FIG. 2 for the first alternative. Only when the actual speed vact exceeds the second hysteresis threshold 45 at the first time point $t_1$, is the step width Δv raised to the value 5 km/h. Only when the actual speed vact drops below the first hysteresis threshold 40 at the second time point $t_2$ following the first time point $t_1$ without previously having reached the third speed range, the step width Δv again drops to the value 2 km/h and remains there until the actual speed vact again exceeds the second hysteresis threshold 45 at a third time point $t_3$ following the second time point $t_2$. In this way, the step width Δv is again raised to the value 5 km/h at the third time point $t_3$. At the fourth time point $t_4$, which follows the third time point $t_3$, the actual speed vact exceeds the fourth hysteresis threshold 55 so that, at the fourth time point $t_4$, the step width Δv is raised to the value 10 km/h. At a fifth time point $t_5$, which follows the fourth time point $t_4$, the actual speed vact drops below the third hysteresis threshold 50 so that, at the fifth time point $t_5$, the step width Δv again drops to the value 5 km/h. At a sixth time point $t_6$, which follows the fifth time point $t_5$, the actual speed vact again drops below the first hysteresis threshold 40 so that, at the sixth time point $t_6$, the step width Δv again drops to the value 2 km/h as shown in FIG. 3b.

For the case that the second alternative is selected, wherein the instantaneous driving situation is defined by the roadway type just then traveled over by the vehicle, it can be provided as described to determine the step width Δv in dependence upon the maximum speed or recommended speed permissible for the roadway just then driven over by the vehicle. This permissible maximum speed or recommended speed can be determined by the evaluation unit 20 in dependence upon the location, for example, the country in which the vehicle is just then traveling. Information or data as to at which location or in which country the vehicle is just then traveling can likewise be transmitted from the navigation apparatus 25 to the data detection unit 15 in the manner described.

It is understood that the foregoing description is that of the preferred embodiments of the invention and that various changes and modifications may be made thereto without departing from the spirit and scope of the invention as defined in the appended claims.

What is claimed is:

1. A method for controlling the speed of a vehicle, the method comprising the steps of:
    changing a desired value for said speed by actuating an operator-controlled element; and,
    adjusting the extent of the change of said desired value in dependence upon at least one piece of data as to the instantaneous driving situation of said vehicle.

2. The method of claim 1, wherein said instantaneous driving situation is defined by the instantaneous location of said vehicle.

3. The method of claim 1, wherein said instantaneous driving situation is defined by the roadway over which said vehicle is instantaneously traveling.

4. The method of claim 1, wherein said instantaneous driving situation is defined by the instantaneous actual speed of said vehicle.

5. The method of claim 1, wherein various extents of the change of said desired value are assigned to different speed ranges.

6. The method of claim 1, wherein the extent of the change of said desired value is pregiven at an operator-controlled element for different driving situations.

7. The method of claim 1, wherein the extent of the change of said desired value is changed by means of a hysteresis in dependence upon the instantaneous driving situation.

8. An arrangement for controlling the speed of a vehicle, the arrangement comprising:
    an operator-controlled element for changing a desired value for said speed;
    means for detecting at least one piece of data as to an instantaneous driving situation of said vehicle; and,
    an evaluation unit for adjusting the extent of the change of said desired value in dependence upon said at least one piece of data as to said instantaneous driving situation of said vehicle.

9. The arrangement of claim 8, wherein said operator-controlled element is a steering column lever.

10. The method of claim 1, wherein said operator-controlled element is a steering column lever.

11. A method for controlling the speed of a vehicle, the method comprising the steps of:
    actuating an operator-controlled element to change a desired value for said speed of said vehicle;
    adjusting the extent of said change of said desired value in dependence upon at least one piece of data as to the instantaneous driving situation of said vehicle;
    setting a step width for changing said desired value in dependence upon the instantaneous actual speed of said vehicle; and,
    changing said desired value by said step width with a one-time actuation of said operator-controlled element.

12. An arrangement for controlling the speed of a vehicle, the arrangement comprising:
    an operator-controlled element for changing a desired value for said speed;
    means for detecting at least one piece of data as to an instantaneous driving situation of said vehicle;
    an evaluation unit for adjusting the extent of the change of said desired value in dependence upon said at least one piece of data as to said instantaneous driving situation of said vehicle;
    means for changing said desired value by a pregiven step width with a one-time actuation of said operator-controlled element;
    means for detecting the instantaneous actual speed of said vehicle; and,
    said evaluation unit including means for setting said step width in dependence upon said instantaneous actual speed of said vehicle.

13. A method for controlling the speed of a vehicle, the method comprising the steps of:
actuating an operator-controlled element to change a desired value for said speed of said vehicle;
setting a step width for changing said desired value in dependence upon the highest permissible speed of the roadway just then traveled on by said vehicle; and,
changing said desired value for said speed by said step width with a one-time actuation of said operator-controlled element.

14. An arrangement for controlling the speed of a vehicle, the arrangement comprising:
an operator-controlled element for changing a desired value for said speed;
means for detecting at least one piece of data as to an instantaneous driving situation of said vehicle;
an evaluation unit for adjusting the extent of the change of said desired value in dependence upon said at least one piece of data as to said instantaneous driving situation of said vehicle;
means for changing said desired value by a pregiven step width with a one-time actuation of said operator-controlled element;
means for detecting the highest permissible speed of the roadway just then traveled by said vehicle; and,
said evaluation unit including means for setting said step width for changing said desired value in dependence upon said permissible highest speed.

* * * * *